April 19, 1960 C. J. FITCH ET AL 2,933,245

SENSING NEGATIVE AND POSITIVE PHOTO RECORDS

Filed Dec. 30, 1954 2 Sheets-Sheet 1

INVENTORS
Clyde J. Fitch
Edmund A. Barber Jr.
BY [signature]
ATTORNEY

| NUMERAL | CODE | |
|---|---|---|
| | WHITE | BLACK |
| 1 | 12 | 345 |
| 2 | 13 | 245 |
| 3 | 14 | 235 |
| 4 | 23 | 145 |
| 5 | 24 | 135 |
| 6 | 34 | 125 |
| 7 | 123 | 45 |
| 8 | 124 | 35 |
| 9 | 134 | 25 |
| 0 | 234 | 15 |

INVENTORS
Clyde J. Fitch
Edmund A. Barber Jr.
BY [signature]
ATTORNEY

United States Patent Office 2,933,245

Patented Apr. 19, 1960

2,933,245

SENSING NEGATIVE AND POSITIVE PHOTO RECORDS

Clyde J. Fitch, Endicott, and Edmund A. Barber, Jr., Johnson City, N.Y., assignors to International Business Machines Corporation, New York, N.Y., a corporation of New York Application December 30, 1954, Serial No. 478,582

4 Claims. (Cl. 235—61.11)

This invention relates to means for distinguishing between negative and positive marks on photographic film and, more particularly, to sensing and interpreting code elements on positive or negative photographic film background. Photoelectric sensing or reading of code elements on a photographic document may be accomplished by having the code elements or bits comprising the coded character on the photographic film in a prearranged position and sequence, so that these elements can be used to indicate various types of information. For example, the code elements may be used to represent numeric information, such as a serial number. The present invention is particularly directed to the handling and translation of data recorded by a photographic process, wherein the body background carrying the code may be either positive or negative in character, the bits of information, of which any desired number ($n$) may be used, being such as to select the desired character, whether the bits be on a positive or on a negative body background. In addition, the sensing means is provided with means for sensing or reading a particular or code selector bit, which is usually such that it will be dependent upon whether the photographically produced body on which the intelligence is recorded is a positive or a negative. Thus, for example, if the reading is effected by means of light transmissibility, and the code selector bit to be used may be chosen as any spot on the background body not containing other bits of intelligence, a spot on a negative film would be relatively opaque, while a correspondingly located spot on a positive film would be relatively transparent or translucent. It is possible, of course, at the particular spot to be read and used as a code selector bit to make a selection independently of the positive or negative character of the film is to be used as an opaque spot on a positive film or a transparent spot on a negative film. In any event, when all the bits including that used for code selection total $n$ in number there will be $n-1$ of these bits as a total of both codes devoted to the identification of the character to be indicated. Thus, predetermined ones of the $n-1$ total of these bits may indicate a predetermined character on one code; while the complementary members of the $n-1$ bits represent the same character on the other code, as these complementary members would appear on a photographically produced body of the reversed kind and made from the body having the bits used in the first named code. Thus, for example, if there are five bits, a first or some predetermined one may be the one to select whether the film (if it be a film) is negative or positive. Of the remaining four ($n-1$), 1, 2 or 3 of the bits may be used in a first code in any combination to predetermined definite characters respectively to be indicated. These bits could be opaque on a positive film and correspondingly would be transparent on a negative film made from the positive film or vice-versa. The remaining 3, 2 or 1 (the complementary bits of the $n-1$ group) are then used to indicate the same characters respectively in the other or second code. Thus it is immaterial whether the information is supplied to the reading means by a positive or a negative film or portions of each indiscriminately mixed, as the information will be read and transmitted accurately under either and both circumstances.

In reading code elements on photographic film, the existence of a mixture of photographic positives or negatives presents a problem in accomplishing the reading of both negatives and positives on the same apparatus.

It is, therefore, desirable to be able to sense the information of code elements on photographic film of both a positive and a negative nature by a single code sensing and translating means. As used in this sense, the term code translating refers not only to the processing of positive and negative codes but more directly to the interpretation of code bits or elements representing a coded character in complement form as well as in true form.

It is an object of this invention to provide a code sensing and interpreting system in which the code elements or bits of a coded record may be read whether the coded characters thereof are represented by code elements or bits in negative form or in positive form, i.e., whether the character representing code elements or bits are in true or in complement form.

It is a further object of this invention to provide a system for reading code elements on photographic film in which a control signal is derived from the background character of the record body.

A still further object of this invention is to provide an apparatus for reading code elements on photographic film either in the positive or the negative form and distinguish between information bits obtained from either the positive or the negative form. These and other objects of this invention will become apparent upon consideration of the following description, taken together with the accompanying drawings, in which.

In general, this invention provides means for sensing and interpreting coded information on photographic film in either positive or negative form and distinguishing between the information coded in the positive form and the information coded in the negative form to provide a differentiated output.

Figure 1:
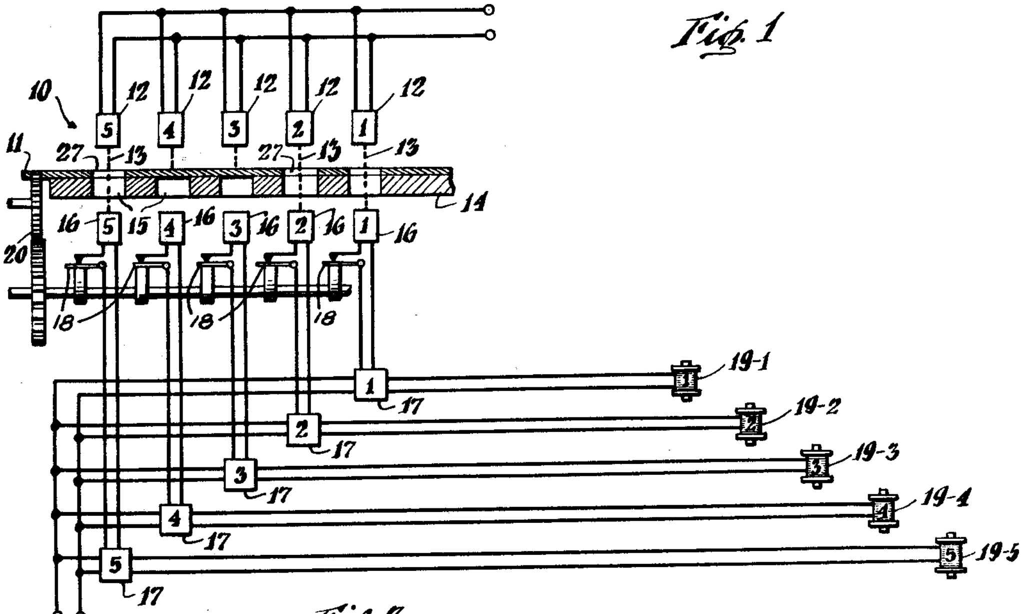
Figure 1 is a schematic diagram of a code sensing apparatus of this invention.

A code sensing apparatus 10 for photo-electrically scanning a unit record in the form of a microfilm 11 is shown in Fig. 1 as having a battery of light emitting means 12 capable of directing beams of light 13. A scanning plate 14 is juxtaposed with the microfilm 11 and contains a series of apertures 15 and a battery of photoelectric cells 16, each of which is aligned with one of the apertures 15 on the axis of one of the beams 13. Each of the photo-electric cells is connected to an amplification unit 17, such as a Thyratron tube through a cycling means, which for the purpose of the description of this embodiment, is shown as an emitter 18. Each of the units 17 energizes a translating relay 19. A drive means 20 provides for movement of the microfilm 11 and the operation of the emitters 18.

Figures 2, 7:
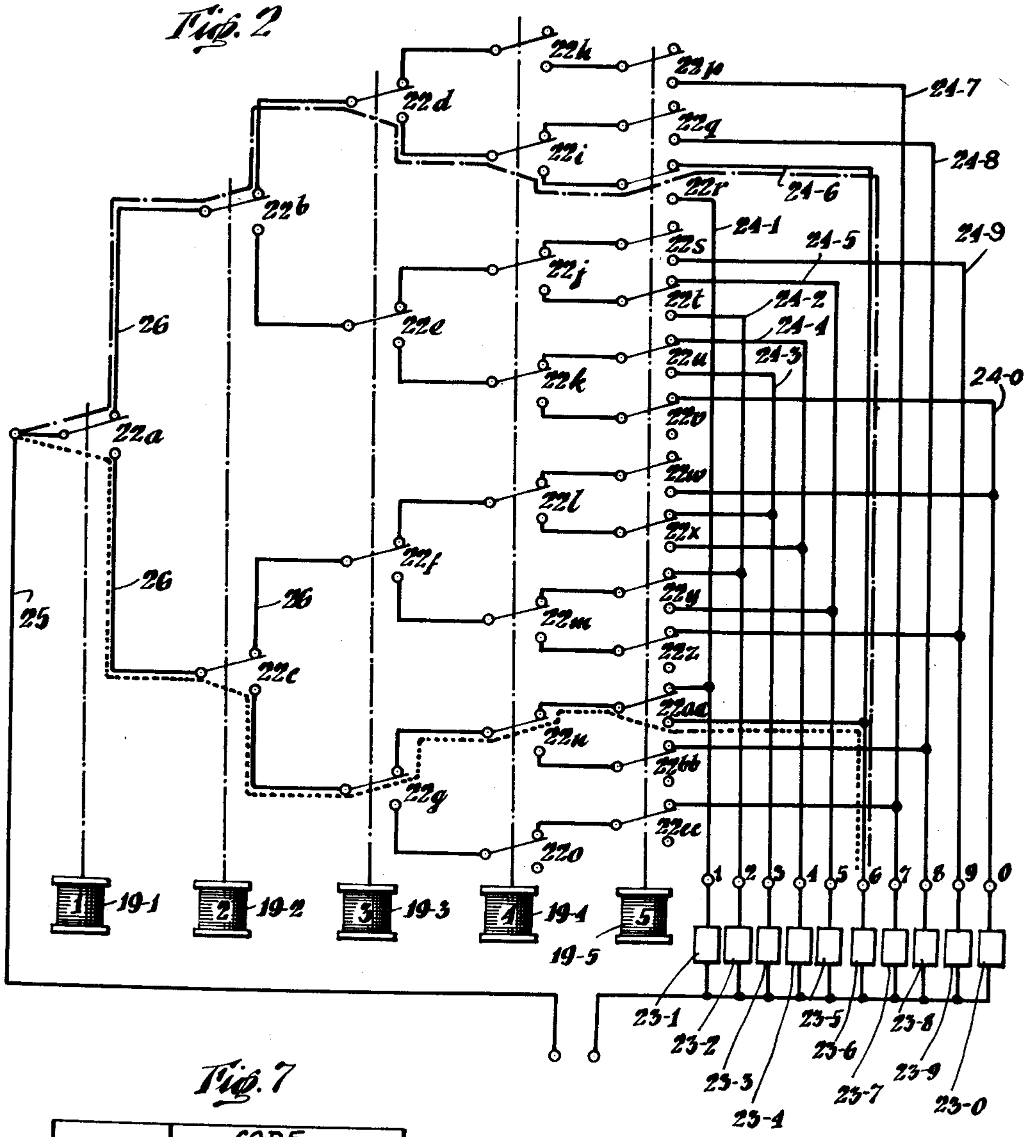
Fig. 2 is a wiring diagram for a code translating circuit of the device of this invention.
Fig. 7 is a chart showing two sets of code elements in a code which may be employed in this invention.

A code translating circuit matrix 21 for converting the information sensed in the sensing apparatus 10 is shown in Fig. 2. The code translating circuit matrix 21 is composed of a matrix of binary contacts 22a through 22cc. The contacts 22a—22cc are operated by the relays 19–1 to 19–5. Specifically, the contacts 22a are operated by translating relay 19–1, the column of contacts 22b and 22c are operated by relay 19–2, the column of contacts 22d 22e, 22f and 22g are operated by relay 19–3, the column of contacts 22h through contacts 22o are operated by relay 19–4, and the column of contacts 22p through 22cc are operated by relay 19–5. In Fig. 2, the contacts 22a through 22cc are indicated in their respective normal positions and each may be moved to an actuated position by the energization of the respective relays 19–1 to 19–5.

The contacts 22a—22cc are connectible together by conductor 26 to form circuit paths through the circuit matrix 21 to a set of numeric relays 23–1 through 23–0. Each numeric relay 23–1 through 23–0 is powered through a respective conductor 24–1 to 24–0. The numeric relays 23–1 through 23–0 represent the ten digits of a decimal code to which the code elements on the microfilm 11 are translated. These numeric relays 23–1 through 23–0 in turn operate such further standard indicating means, not shown, as may be desired. This standard indicating means thus reports the coded information on the microfilm 11 in translated form.

In the translating circuit matrix 21 of the described embodiment, the circuit conductors 24–1 to 24–0 each connects its respective numeric relay 23–1 to 23–0 to two contacts of the column of contacts 22p through 22cc. These contacts 22p through 22cc of the relay 19–5 column in turn are connectible with a power supply line 25 through the suitable conductors 26 and the contacts 22a to 22o. The binary circuit matrix 21 is operable to provide various paths of current from the power line 25 to the respective numeric relays 23–1 to 23–0. The current paths are determined by the positioning of the contacts 22a through 22cc by the respective relays 19–1 through 19–5 and each complete path leads to one of the relays 23–1 to 23–0. Each relay 23–1 to 23–0 is connected by conductors 24, so as to be connectible to the power line 25 through two current paths. The selections of the current paths are determined by the selective activation of the photoelectric cells 16 which result in the energization of the respective translation relays 19–1 through 19–5. The activation of the photoelectric cells 16 by the light beam 13 is controlled by the microfilm 11.

Figures 3, 4, 5:
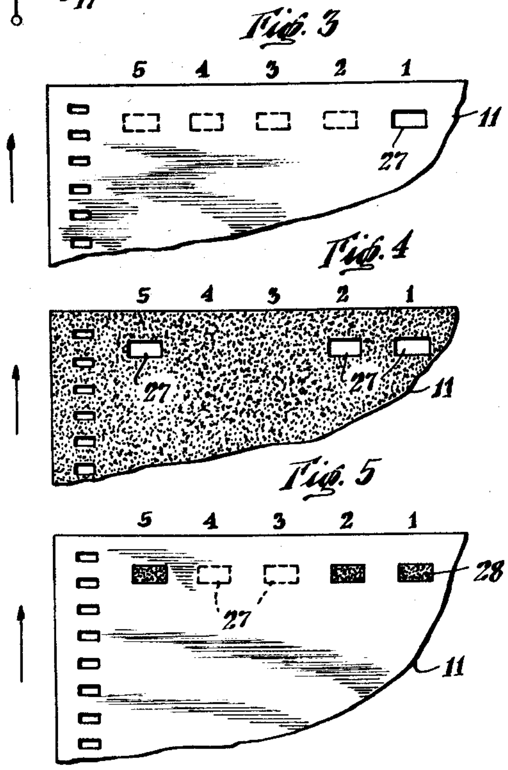
Fig. 3 illustrates a portion of an uncoded card or microfilm.
Fig. 4 illustrates a portion of a coded negative.
Fig. 5 illustrates a portion of a coded positive.
Figure 6:
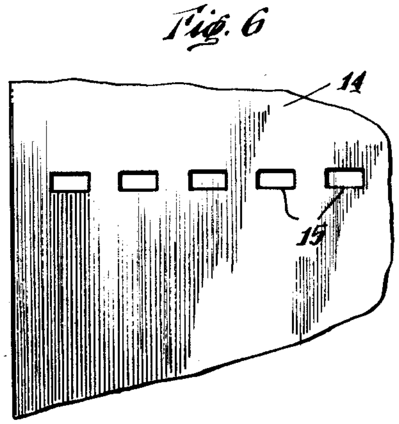
Fig. 6 illustrates a portion of a scanning plate for the unit record of this invention.

Portions of a unit record such as microfilm 11 are shown in Figs. 3, 4 and 5. The portions of microfilm 11 of the various Figs. 3, 4 and 5 are aligned with each other and with relation to five code element positions. Fig. 3 shows a portion of an uncoded microfilm 11. The microfilm 11 of Fig. 3 is a positive and is transparent to light such as beams 13. Fig. 4 illustrates a portion of a coded negative microfilm 11 while Fig. 5 illustrates a portion of a coded positive microfilm 11. The coded negative microfilm 11 is characterized by transparent code spots 27 positioned in code element positions on the microfilm 11. The coded positive microfilm is provided with opaque code spots 28 in the code element positions. A portion of the scanning mask 14 is shown in Fig. 6 as having scanning apertures 15 for the five code element positions.

The apertures 15 in the scanning plate 14 form code spots 27 with the transparent background of the positive microfilm 11 in Fig. 5. As shown in Fig. 1, the light emitting means 12, the beams of light 13, the apertures 15 and the photoelectric cells 16 are aligned on the five code element positions of the unit record code of this embodiment. Fig. 1 shows the negative microfilm 11 of Fig. 4 in position in the apparatus 10 with the three transparent code spots 27 in alignment with the 1, 2 and 5 code element positions.

This invention provides a means and method for reading code marks on a unit record by employing the nature of the background of the record in sensing the coded information and in interpreting the sensed information. The characteristics of transmitting or blocking a photocell activating light beam is the nature of the record employed in the interpretation. The invention is applied particularly to the sensing of coded information on photographic film and employs the light transmitting and blocking characteristics of both negative and positive film in controlling the translation of the coded information regardless of the form in which the information is recorded. The photographic film, negative or positive, carries on it coded information of the opposite light-transmitting nature and employs the light-transmitting nature of its general makeup to contrast with the code elements in the interpretation of the coded information. A predetermined number of code-element positions are employed to represent characters, and in addition, another sensing position in the reading station is provided with a photoelectric cell for sensing whether the film or unit record is positive or negative.

The code employed in the apparatus of this embodiment is a four-element code. This code offers 17 permutations of which 10 are used in translation in the circuit matrix 21. The chart of Fig. 7 shows how the code is used to convey information from the code spots 27 and 28 on the microfilm 11 into digital numeric form. Two columns of the permutations of the four-element code are shown arranged in association with the 1 through 0 digits. One code element column is headed "White" and contains the code elements of a translucent background which will energize the translating relays 19–1 to 19–5, operate the binary matrix contacts 22 and energize the respective numeric relays 23–1 to 23–0 to indicate the respective digits 1 through 0 for the energizing code elements. The code element column under "Black" contains the comparable translucent code elements on an opaque background for operating the respective numeric relays via the above-mentioned circuits. The code spots 27 of the microfilm 11, shown in Figs. 4 and 5, pass the activating beams 16, with the resulting indication of a digit in the numeric relays 23–1 to 23–0.

The four-elements of the code are represented by the four positions 1 through 4 in the apparatus 10 and the scanning plate 14. The positioning of the code spots 27 in these four positions provides two code combinations for each digit, one in the white or positive column, as shown in Fig. 7, and one in the black or negative column. For example, the microfilm 11 of Fig. 5 shows a positive film according to this embodiment having the transparent code spots 27 in the 3 and 4 positions. The code spots 27 of the positive microfilm 11 are formed by the combination of the transparency of the microfilm 11 and the juxtaposed scanning plate apertures 15. The light beams 13 will pass through the microfilm 11 only at the areas enclosed in dotted outline. The positive microfilm 11 of Fig. 5 will accordingly energize the translating relays 19–3 and 19–4 when positioned in the light beams 13 in the code sensing apparatus 10. The energization of the relay 19–3 moves contacts 22d through 22g from the normal position to the actuated position. The energization of the relay 19–4 moves contacts 22h through 20o from the normal position to the actuated position. The resultant current path through the circuit matrix 21 is shown in dot and dash line running from the power line 25 through contacts 22a, 22b, 22d, 22i and 22r to the conductor 24–6 connected to numeric relay 23–6. The coded information represented by the 3 and 4 position code spots 27 of the Fig. 5 microfilm 11 is thus translated to a decimal 6.

The positive film of Fig. 5 is shown in negative form in Fig. 4 in which the microfilm 11 has a dark negative background with three transparent code spots 27 forming translucent pathways through the otherwise opaque negative film. These code spots 27 of Fig. 4 are the reverse of opaque spots 28 in the 1, 2 and 5 positions of Fig. 5. In other words, if the 3 and 4 code of Fig. 5 is considered to be the true representation of the coded character, the 1 and 2 code of Fig. 4 may be considered as the complementary representation of the same character. The spots 27 of the microfilm 11 of Fig. 4 permit energization of translating relays 19–1, 19–2 and 19–5 in the apparatus 10. The energization of relay 19–1 moves contacts **22*a* from normal position to actuated position. The energization of relay 19–2 moves contacts 22*b* and 22*c* from normal position to actuated position. The energization of relay 19–5 moves contacts 22*p* through 22*cc* from normal position to actuated position. The resultant current path through the circuit matrix 21 is shown in dotted line running from the power line 25 through contacts 22*a* in actuated position, contacts 22*c* in actuated position, contacts 22*g* and 22*n* in normal position and contacts 22*aa* in actuated position to conductor 24–6. The numeric relay 23–6 is thus actuated by the negative microfilm 11** of Fig. 5.

It will be seen that the positive Fig. 5 microfilm 11 is the inverse of the negative Fig. 4 microfilm 11. The opaque spots 28 at the 1, 2 and 5 positions of Fig. 5 are equivalent to the dark background in positions 3, 4 of Fig. 4 in blocking light. Conversely, transparent spots 27 at positions 1, 2 and 5 of Fig. 4 are equivalent to the transparent background of Fig. 5 in positions 3, 4 in passing light, so that where light is blocked in Fig. 4 it is passed in Fig. 5 and vice versa.

The four code elements 1 through 4 alone are not useful in sensing information in a mixture of positives and negatives. The 1 to 4 code element channels in the sensing means 10 and translating matrix 21 may be activated by the translucent spots 27 on Fig. 4 negative film 11 and the Fig. 5 positive film 11. The activation of two channels by two spots 27 on either negatives or positives could produce identical current paths and the resultant translated information would be indistinguishable as to nature of origin. The problem is complicated by the fact that the inversion of light transparency between a negative and a positive will cause negative 1, 2 code elements to appear as 3, 4 code elements on its corresponding positive. It is, therefore, necessary to ascertain whether the background of the unit record microfilm 11 as either a negative or a positive to determine whether the coded character is in true form or in complement form.

The odd or fifth spot 27 or spot 28 provides the means and method for differentiating between positives and negatives. By providing an opaque spot 28 in the fifth position of the Fig. 5 positive, this channel of the code is blocked in reading the positive. However, it provides the transparent code spot 27 on the Fig. 4 negative which allows activation of translating relay 19–5 and actuates the contacts **22*p* to 22*cc*** of the fifth column. This introduces a differentiating factor in the code sensing and translating which can be used to distinguish the negatives from the positives.

Two code combinations are provided for each digit as shown in Fig. 7, one for positives and one for negatives. The microfilm 11 is moved uniformly through the sensing apparatus 10 by the drive means 20, which also operates the cycling emitter 18 to connect the photoelectric cells 16 to their respective relays at each cycle point when the code information is in position for sensing. The cells 16 are rendered effective to operate their related relays, therefore, only when the code spots 27 are over the scanning apertures 15 so that they may differentiate between positive and negative records and at the same time sense the coded character represented by code bits 1 through 4. The scanning apertures 15 are smaller than the code spots 27.

Various modifications may be made in the above embodiment within the spirit of this invention. For example, parallel or row-by-row reading may be substituted by serial sensing of the code positions sequentially in time and feeding the resultant data into a single channel which could set up a translating means during a reading phase. The set-up information could then be read out to numeric indicating means in a subsequent phase. As another modification, the translating relays could be replaced with equivalent diode switching circuits.

Moreover, as indicated above, this invention broadly relates to the interpretation of intelligence as it appears on a record having regular and inverted forms. It is not intended that this invention be limited merely to detecting and changing information from one code to another, rather, this invention relates to the interpretation by a single means of intelligence on successive records which carry the intelligence in either a regular or an inverted form. Accordingly, modifications of the above described embodiment which effectuate such intelligence interpretation are within the scope of this invention. It will also be seen that opaque positive and negative documents may be sensed by the apparatus described above by reflecting light from the surface of the document to a photocell.

Further modifications are readily apparent while preserving and attaining the advantages of this invention which include the obtaining of the correct output of code information from a photographic record regardless of the form in which the record is presented. For example, the film may be either a continuous strip or in cards. Accordingly, it is intended that this invention be limited only by the scope of the appended claims.

What is claimed is:

1. In a system for reading and translating data represented in a multi-element combinational code on a record body in the form of either translucent or opaque code areas, respectively, on opaque and translucent body background whereby the translucent combinational elements on one body background represent the character in true form and the translucent combinational elements on the other body background represent the character in complement form, a first code translating network adapted to translate a coded character represented in true form by translucent areas on a record body to a different notation, a second code translating network adapted to translate the same coded character represented in complement form by translucent areas on a record body to the same different notation, a record reading station having a photosensitive device for each element of a coded character, light source means adapted to transmit light through said record body to activate such of said photosensitive devices corresponding to translucent code element positions in said body, means responsive to said photosensitive devices for conditioning one of said translating networks, a photosensitive record detecting device in said record reading station responsive to the light-transmissibility of a predetermined spot on said coded body and adapted to sense whether the record area on which the same is operative is either translucent or opaque, and means responsive to said record detecting device for selecting the one of said first and second code translating networks through which a character is to be translated in accordance with the light-transmissibility of said predetermined spot on said coded body.

2. A system for reading and translating data in accordance with claim 1, further comprising means for feeding a record through said record reading station, and means operative in timed relationship with said record feeding means for rendering said photosensitive devices responsive means responsive to said photosensitive devices.

3. Apparatus for translating code symbols, each of $n$ bits into selected ones of a predetermined number of characters, comprising a selector electrical circuit network having $n$ selector means for controlling circuit paths through said network, an output from said network to an output means for each of said predetermined number of characters into which the code is to be translated, a first and a second circuit path through said network leading to the output thereof for each of said characters, said first circuit path for each of said characters respectively being activated by certain of $n-1$ bits of said code and said second circuit path for each of said characters respectively being activated by the complementary ones of said $n-1$ bits, reading means responsive to each of the bits of said code respectively, means connecting one of said reading means responsive to a predetermined one of said bits, which is not otherwise employed for the selection of any of said characters, to said electrical circuit network in such a way as to cause the selection of the first or the second of said circuit paths independently of the location or the number of the remaining bits required to control said network for the selection of one of said characters, and means connecting the rest of said reading means to said network for the control of the selection of circuit paths therethrough.

4. An apparatus for translating code signals in accordance with claim 3, in which $n$ is five, and in which said predetermined number of characters into which the code is to be translated is ten, these ten characters being the digits 0–9 inclusive respectively.

References Cited in the file of this patent

UNITED STATES PATENTS

| | | |
|---|---|---|
| 2,254,932 | Bryce | Sept. 2, 1941 |
| 2,614,632 | Clos | Oct. 21, 1952 |